United States Patent
Gadkaree et al.

(10) Patent No.: US 9,613,760 B2
(45) Date of Patent: Apr. 4, 2017

(54) ENERGY STORAGE DEVICE AND METHODS FOR MAKING AND USE

(71) Applicant: Corning Incorporated, Corning, NY (US)

(72) Inventors: Kishor Purushottam Gadkaree, Painted Post, NY (US); Jia Liu, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 133 days.

(21) Appl. No.: 14/711,174

(22) Filed: May 13, 2015

(65) Prior Publication Data

US 2015/0364266 A1    Dec. 17, 2015

Related U.S. Application Data

(60) Provisional application No. 62/011,264, filed on Jun. 12, 2014.

(51) Int. Cl.

| | |
|---|---|
| H01G 11/34 | (2013.01) |
| C01B 31/12 | (2006.01) |
| H01G 11/24 | (2013.01) |
| H01G 11/42 | (2013.01) |
| H01G 11/44 | (2013.01) |
| C01B 31/14 | (2006.01) |
| H01G 11/52 | (2013.01) |
| H01G 11/58 | (2013.01) |
| H01G 11/76 | (2013.01) |

(52) U.S. Cl.
CPC ............ *H01G 11/34* (2013.01); *C01B 31/12* (2013.01); *C01B 31/14* (2013.01); *H01G 11/24* (2013.01); *H01G 11/42* (2013.01); *H01G 11/44* (2013.01); *H01G 11/52* (2013.01); *H01G 11/58* (2013.01); *H01G 11/76* (2013.01); *C01P 2006/12* (2013.01); *C01P 2006/40* (2013.01); *Y02E 60/13* (2013.01); *Y10T 428/2982* (2015.01)

(58) Field of Classification Search
None
See application file for complete search history.

(56) References Cited

U.S. PATENT DOCUMENTS

| | | | | |
|---|---|---|---|---|
| 7,907,387 B2* | 3/2011 | Aubert | ............... | H01G 11/38 |
| | | | | 361/502 |
| 8,198,210 B2* | 6/2012 | Gadkaree | ............ | C01B 31/083 |
| | | | | 502/417 |
| 8,541,338 B2* | 9/2013 | Gadkaree | ............... | C01B 31/10 |
| | | | | 423/445 R |
| 8,564,934 B2 | 10/2013 | Gadkaree et al. | | |
| 2007/0201184 A1 | 8/2007 | Plee et al. | | |
| 2008/0233273 A1* | 9/2008 | Aubert | ............... | H01G 11/38 |
| | | | | 427/77 |
| 2009/0124485 A1 | 5/2009 | Plee | | |
| 2010/0216027 A1* | 8/2010 | Fujii | ............... | H01G 9/016 |
| | | | | 429/246 |
| 2012/0270102 A1* | 10/2012 | Whitacre | ............... | H01G 11/24 |
| | | | | 429/205 |
| 2014/0104752 A1 | 4/2014 | Bendale et al. | | |

FOREIGN PATENT DOCUMENTS

| | | |
|---|---|---|
| CA | 2979917 | 11/2011 |
| CN | 102963891 | 3/2013 |
| JP | 2002246276 | 8/2002 |
| JP | 2003104710 | 4/2003 |
| WO | 2011090993 | 7/2011 |

OTHER PUBLICATIONS

A. G. Pandolfo et al., "Carbon properties and their role in supercapacitors", Journal of Power Sources, 157 (2006), pp. 11-27.
Nakamura M et al: "Influence of physical properties of activated carbons on characteristics of electric double-layer capacitors", Journal of Power Sources, Elsevier Sa. Ch., vol. 60. No. 2, 1996, pp. 225-231.

\* cited by examiner

*Primary Examiner* — Dion R Ferguson
(74) *Attorney, Agent, or Firm* — John L. Haack

(57) ABSTRACT

An electrode in an energy storage device, including:
  an activated carbon, including:
    a surface area of from 1000 to 1700 $m^2/g$;
    a pore volume from 0.3 to 0.6 cc/g;
    a chemically bonded oxygen content of 0.01 to 1.5 wt %; and
    a pH of from 7.5 to 10. Also disclosed is a method of making the activated carbon, the electrode, and the energy storage device.

10 Claims, 11 Drawing Sheets

U.S. 9,613,760 B2

ENERGY STORAGE DEVICE AND METHODS FOR MAKING AND USE

This application claims the benefit of priority under 35 U.S.C. §119 of U.S. Provisional Application Ser. No. 62/011,264 filed on Jun. 12, 2014, the content of which is relied upon and incorporated herein by reference in its entirety.

The entire disclosure of any publications or patent documents mentioned herein are incorporated by reference.

BACKGROUND

The disclosure generally relates to an energy storage device and methods for making and use of the device.

SUMMARY

The disclosure provides an energy storage device and methods for making and use of the device.

BRIEF DESCRIPTION OF THE DRAWINGS

In embodiments of the disclosure.

DETAILED DESCRIPTION

Figure 1:
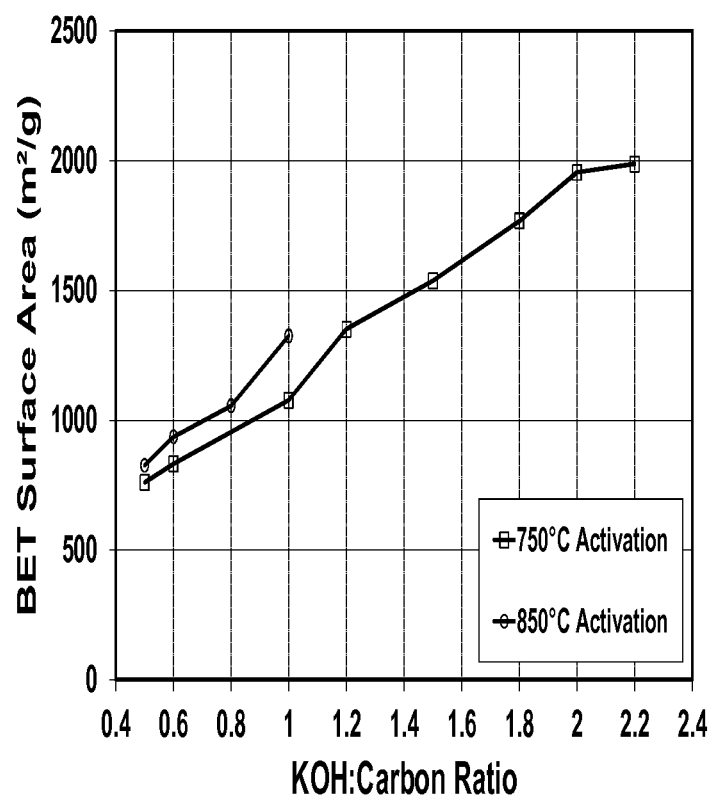
FIG. 1 shows BET surface area measurements as a function of KOH to carbon (or char) ratio for the alkali activation of wheat derived char.

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

DEFINITIONS

"Electrochemical double layer capacitor," "EDLC," "supercapacitor," "ultracapacitor," and like terms refer to electrochemical capacitors having double layer capacitance and pseudocapacitance. "EDLC cell," "EDLC button cell," and like terms refer to an electrochemical double layer capacitor having, for example, a housing, and within or integral with the housing: two electrodes; a separator between the electrodes; an electrolyte in contact with the electrodes; and optionally two current collectors, and as described in the Examples section.

"Chemically bonded oxygen content" and like terms refer to oxygen that is attached to carbon via chemical bonds and excluding oxygen present as molecular oxygen, water, carbon dioxide, and other oxygen-containing gas molecules that are physically adsorbed on carbon, and as mentioned in commonly owned and assigned U.S. Pat. No. 8,541,338. In embodiments of the present disclosure, the lower the chemically bonded oxygen content in the activated carbon, the better the activated carbon will perform in capacitor applications.

"Pore volume" and like terms refer to the void volume within the activated carbon, see also commonly owned and assigned U.S. Pat. No. 8,564,934.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

"Optional" or "optionally" means that the subsequently described event or circumstance can or cannot occur, and that the description includes instances where the event or circumstance occurs and instances where it does not.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, times, and like aspects, and ranges thereof, are for illustration only;

they do not exclude other defined values or other values within defined ranges. The composition and methods of the disclosure can include any value or any combination of the values, specific values, more specific values, and preferred values described herein, including explicit or implicit intermediate values and ranges.

Activated carbon is typically made by physical activation (e.g., using $CO_2$ or steam as activating agent) or chemical activation (e.g., using KOH, $K_2CO_3$, NaOH, $Na_2CO_3$, $AlCl_3$, $ZnCl_2$, $MgCl_2$, or $H_3PO_4$, etc., as activating agent) of a carbonaceous material at high temperatures (e.g., 500° C. or higher) to create porosity and surface area in the carbon. It is significant to engineer the porosity and surface area of the carbon in the activation step to meet the requirements of a particular application. For electrochemical double layer capacitor (EDLC) applications, it is desirable to create large quantities of micropores in the activated carbon to achieve high performance. Chemical activation, in particular alkali activation (i.e., activation by alkali metal compounds), is well suited for making activated carbon for EDLC.

It is known that a large surface area and a large pore volume are required of activated carbon to achieve high specific capacitance in EDLC. Such activated carbon can be readily made by alkali activation (e.g., KOH, NaOH, etc.) of a carbonaceous material (e.g., char, coke, etc.), but a large amount of activation agent is called for. For instance, for KOH activation of char, a KOH:char weight ratio of 2:1 or higher is often used. Cost modeling has shown that at a weight ratio of 2:1, KOH is the single largest cost driver, approximately one third of the Cost of Goods Sold (COGS). Such high weight ratios can also lead to significant challenges for the alkali activation process in manufacturing including, for example:

a high raw material cost due to large amount of activation agent, which also leads to a higher burn-off rate of the carbon that leads to lower carbon yield;

severe equipment corrosion;

severe process hazards related to the generation of alkali metal as a reaction byproduct; and large volume expansion of batch material due to melting of the activation agent combined with release of water and gases from the batch, which in turn can limit process throughput.

All of these challenges can contribute to the relatively high cost of making alkali activated carbon in the prior art, and are major reasons why alkali activation has not been widely adopted in large-scale manufacturing of activated carbon.

Furthermore, EDLC cells must meet stringent commercial requirements for durability. Current specifications widely accepted in the industry call for a cell to retain greater than or equal to 80% of initial capacitance and to maintain less than or equal to 200% of initial equivalent series resistance (ESR) after 1500 hours of stress test at the rated voltage and 65° C. The state-of-the-art of EDLC cells in the industry are rated for 2.7 V or lower. It is highly desirable to increase the voltage rating because the energy density of a cell depends on the square of the working voltage. Solving the durability issue at higher voltages remains a significant challenge.

Commonly owned and assigned U.S. Pat. No. 8,541,338, issued to Gadkaree, et. al., on Sep. 24, 2013, entitled "Highly porous activated carbon with controlled oxygen content," mentions nanoporous activated carbon material having a high specific capacitance in EDLCs and controlled oxygen content, and methods for making such activated carbon material. Reduction of oxygen content is achieved by: curing a carbon precursor/additive mixture in an inert or reducing environment; refining (heating) activated carbon material after synthesis in an inert or reducing environment; or both. The inert or reducing environment used for curing or refining is preferably substantially free of oxygen.

The disclosure provides an energy storage device and methods for making and use of the device.

In embodiments, the present disclosure provides an electrode in an energy storage device, comprising or consisting of:

a first activated carbon, comprising:

a surface area of from 1000 to 1700 $m^2/g$;

a pore volume from 0.3 to 0.6 cc/g;

a chemically bonded oxygen content of 0.01 to 1.5 wt %; and a pH of from 7.5 to 10.

In embodiments, the first activated carbon can have, for example, at least one of: a surface area from 1300 to 1700 $m^2/g$; a pore volume from 0.4 to 0.6 cc/g, a pH from 8 to 10; an oxygen content of 0.01 to 1 wt %; an initial specific capacitance of 80 F/cc to 120 F/cc, as measured in a symmetrical electrochemical double layer capacitor cell with an organic electrolyte; or a combination thereof. An organic electrolyte comprises a salt, for example, tetraethylammonium tetrafluoroborate (TEA-TBF), triethylmethylammonium tetrafluoroborate (TEMA-TFB), or some other commonly used electrolyte salt, dissolved in an organic solvent, for example, acetonitrile, propylene carbonate, or some other commonly used organic solvent; or a combination thereof by mixing two or more salts, two or more organic solvents, or both.

In embodiments, the energy storage device can be, for example, an electrochemical double layer capacitor having a durability characterized by maintaining at least 80% of initial capacitance, and a maximum 200% of initial equivalent series resistance (ESR) when held at 3V and 65° C. for 1500 hours.

In embodiments, the present disclosure provides an energy storage device, comprising: at least one electrode, comprising or consisting of:

a first activated carbon, comprising:

a surface area of from 1000 to 1700 $m^2/g$;

a pore volume from 0.3 to 0.6 cc/g;

an chemically bonded oxygen content of 0.01 to 1.5 wt %; and a pH of from 7.5 to 10.

In embodiments, the energy storage device can further comprise, for example:

a housing, and within the housing:

a positive and a negative electrode;

a separator situated between the electrodes;

an electrolyte; and optionally two current collectors.

In embodiments, the positive and the negative electrodes can be, for example, compositionally or physically, the same or different.

In embodiments, the positive electrode and the negative electrode are the same, i.e., symmetrical. In embodiments, the positive electrode and the negative electrode both comprise the first activated carbon.

In embodiments, the positive and the negative electrode are different, i.e., unsymmetrical. In embodiments, the positive electrode comprises the first activated carbon and the negative electrode comprises a second activated carbon, for example, commercially available YP-50F, that is different from the first activated carbon.

In embodiments, the device can be, for example, an electrochemical double layer capacitor having a durability characterized by maintaining at least 80% of initial capacitance and at most 200% of initial equivalent series resistance when held at 3V and 65° C. for 1500 hours.

In embodiments, the present disclosure provides a first activated carbon in an electrode in an energy storage device, the first activated carbon comprising or consisting of:
a surface area of from 1000 to 1700 $m^2/g$;
a pore volume from 0.3 to 0.6 cc/g;
an chemically bonded oxygen content of from 0.01 to 1.5 wt %; and
a pH of from 7.5 to 10.

In embodiments, the electrode can further include a conductive additive such as carbon black, and a binder.

In embodiments, the present disclosure provides a method of making a first activated carbon, comprising or consisting of:
either:
carbonizing a suitable carbon source material to form a char, the carbon source material being selected from, for example, the group consisting of wheat flour, walnut flour, corn flour, corn starch, rice flour, potato flour, beets, millet, soybean, barley and cotton, nut shells, a phenolic resin, poly(vinyl alcohol), polyacrylonitrile, and combinations thereof; for example, wheat flour was carbonized at 800° C. in a retort furnace purged with $N_2$;
or:
providing a suitable carbonaceous material selected from, for example, the group of char, coke, coal, pitch, activated carbon, or combinations thereof;
powdering the carbonized source material or the provided carbonaceous material to fine carbon particles having a $d_{50}$ of about 3 to 10 microns, for example, powder milling the char to a $d_{50}$ of about 5 microns; and
heating a mixture of the fine carbon particles and an alkali hydroxide (MOH), for example, mixing the char powder with a KOH powder at a desired ratio, at a MOH:char or alkali hydroxide to carbon weight ratio of from 2.5:1 to 0.5:1, to produce the first activated carbon.

In embodiments, the MOH:char or alkali hydroxide to carbon weight ratio can be, for example, of from 1.5:1 to 1:1.

In embodiments, the MOH can be, for example, NaOH, KOH, or a mixture thereof.

In embodiments, the heating can be accomplished, for example, in a furnace in a $N_2$ atmosphere at from 600 to 1000° C., for from 0.25 to 4 hrs. The heating can include a ramp-up at a 150° C./hr to a desired activation temperature, soak for 2 hours, and unassisted cool-down to 120° C.

In embodiments, the method can further comprise, for example, introducing water vapor after the heated mixture is cooled down to from 100° C. to 400° C.

In embodiments, the method can further comprise, for example, washing and filtering the activated carbon, sequentially in: DI water, a HCl solution, and DI water, until the filtrate pH is approximately the same ambient pH as the DI water, for example, from pH 5 to 7.5, including intermediate values and ranges.

In embodiments, the method can further comprise, for example, heat treating the washed first activated carbon in an inert atmosphere, a reducing atmosphere, or a combination thereof, at from 500 to 1000° C. for from 0.25 to 4 hrs.

In embodiments, the present disclosure provides a high performance activated carbon for EDLC applications. The disclosed first activated carbon can be characterized by a moderate surface area of, for example, from 1000 to 1700 $m^2/g$, and a pore volume of, for example, from 0.3 to 0.6 cc/g. These properties diverge from a conventional view that high surface area (e.g., 1800 $m^2/g$ or higher) and large pore volume (e.g., 0.7 cc/g or higher) are required to attain high specific capacitance. For example, Kansai Coke MSP-20, a commercially available KOH activated carbon, has a surface area of about 2300 $m^2/g$ and a pore volume of about 0.8 g/cc.

In embodiments, the present disclosure provides an activated carbon having basic surface functionalities and having a pH greater than 7, such as 7.5 to 10, 8 to 10, and 8 to 9.5, including intermediate values and ranges. The basic surface functionalities and pH properties are advantageous because acidic surface functionalities can be detrimental to the long-term durability of EDLC devices. Preferably, the first activated carbon of the disclosure can have a pH from 8 to 10, more preferably, the first activated carbon has a pH from 8 to 9, including intermediate values and ranges.

In embodiments, the present disclosure provides an activated carbon having a chemically bonded oxygen content of from 0.01 to 1.5 wt % based on the total weight of the first activated carbon. The low content of chemically bonded oxygen is advantageous because oxygen surface functionalities can be detrimental to the long-term durability of EDLC devices (see, for example, Pandolfo, A. G., et al., Carbon properties and their role in supercapacitors, *Journal of Power Sources*, 2006, 157, 11-27, and references therein). Preferably, the disclosed activated carbon has an oxygen content of from 0.01 to 1.0 wt %, including intermediate values and ranges.

In embodiments, the disclosed activated carbon has been demonstrated in EDLC cells to have one of the highest initial capacitances, such as from 80 F/cc to 120 F/cc, compared to comparable cells, excellent durability at 3V and 65° C., and that meet industrial specifications.

In embodiments, the present disclosure also provides a process for making an activated carbon, which involves activating a char with KOH at a KOH:char weight ratio as low as 1:1, and the process alleviates the process challenges mentioned herein. The KOH:char (or KOH:carbon, used interchangeably) ratio is defined as ratio of KOH solid weight to char (or carbon) solid weight in the feed material for activation.

The disclosed composition (i.e., activated carbon), article (i.e., electrode), device (i.e., energy storage device), and methods of making and use are advantaged by providing, for example, at least one of:
high performance activated carbon for EDLC articles or devices, as measured by high volumetric specific capacitance;
basic surface functionalities on the carbon and having a pH greater than 7, compared to acidic surface functionalities, which acidic surfaces are believed to be detrimental to the long-term durability of EDLC devices; and
significant process improvements obtained from the low KOH ratios used to make the activated carbon, including, for example:
lower material cost due to less KOH usage and higher carbon yield (i.e., lower burn-off);
higher throughput, as measured by the activated carbon product volume, in the same equipment because less KOH needs to be processed and the carbon yield is higher;
lower equipment maintenance cost due to less corrosion and less safety concerns related to alkali metal; and
lower operating and manufacturing costs realized from reduced downtime attributable to corrosion and potassium clean-out.

Referring to the figures, FIG. 1 shows BET surface area measurements as a function of KOH to carbon (or char) ratio for the alkali activation of wheat derived char at 750° C. and 850° C. All of the samples were heat treated at 675° C. (see Example 1).

Figure 2:
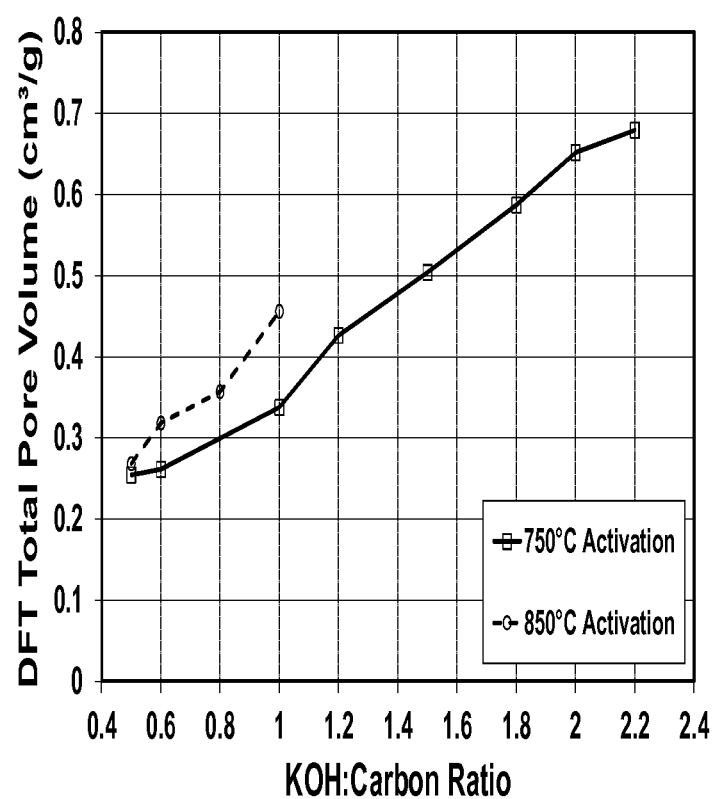
FIG. 2 shows Density Functional Theory (DFT) pore volume as a function of KOH to carbon (or char) ratio for the alkali activation of wheat derived char.

FIG. 2 shows Density Functional Theory (DFT) pore volume as a function of KOH to carbon (or char) ratio for the alkali activation of wheat derived char at 750° C. and 850° C. All of the samples were then heat treated at 675° C. (see Example 1).

Figure 3:
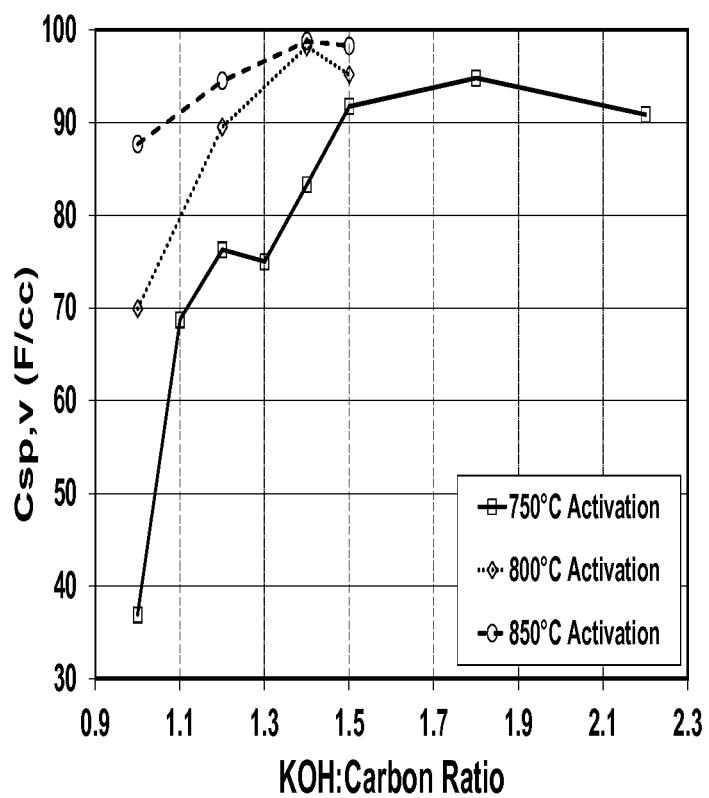
FIG. 3 shows volumetric specific capacitance (Csp, v) measured in symmetrical button cells as a function of the KOH to carbon (or char) weight ratio at three different activation temperatures.

FIG. 3 shows volumetric specific capacitance (Csp, v) measured in symmetrical button cells as a function of KOH to carbon (or char) weight ratio for the three series of activated carbon samples activated at 750° C. (8 samples in the series), 800° C. (4 samples in the series), and 850° C. (4 samples in the series), respectively, and then heat treated at 675° C. (see Example 1). The samples within each series had a different MOH:carbon ratio but the same activation temperature.

Figure 4:
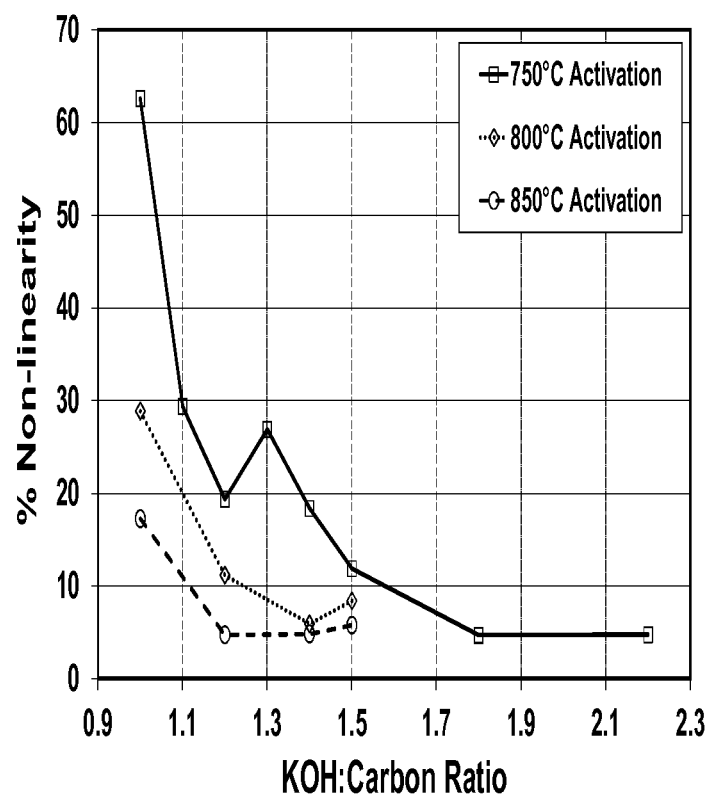
FIG. 4 shows the percentage non-linearity measured in symmetrical button cells as a function of KOH to carbon (or char) weight ratio for activated carbon samples prepared at three different activation temperatures.

FIG. 4 shows the non-linearity measured in symmetrical button cells as a function of KOH to carbon (or char) ratio for the series of three carbon activated samples at 750° C., 800° C., and 850° C., respectively, and then heat treated at 675° C. (see Example 1).

Figure 5:
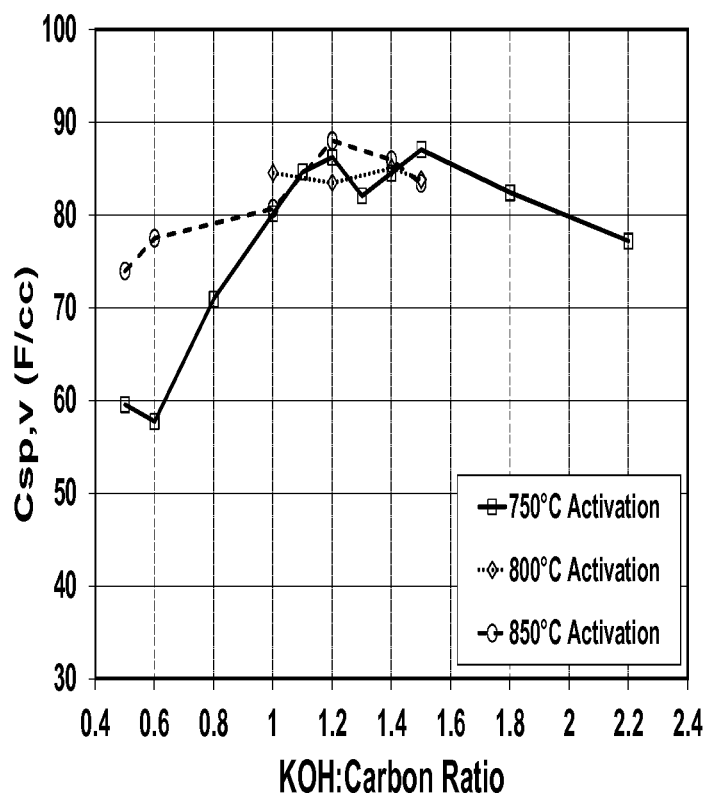
FIG. 5 shows volumetric specific capacitance measured in unsymmetrical button cells as a function of KOH to carbon (or char) weight ratio for activated carbon samples prepared at three different activation temperatures.

FIG. 5 shows volumetric specific capacitance measured in unsymmetrical button cells as a function of KOH to carbon (or char) weight ratio for the series of three carbon activated samples at 750° C., 800° C. and 850° C., respectively, and then heat treated at 675° C. (see Example 1).

Figure 6:
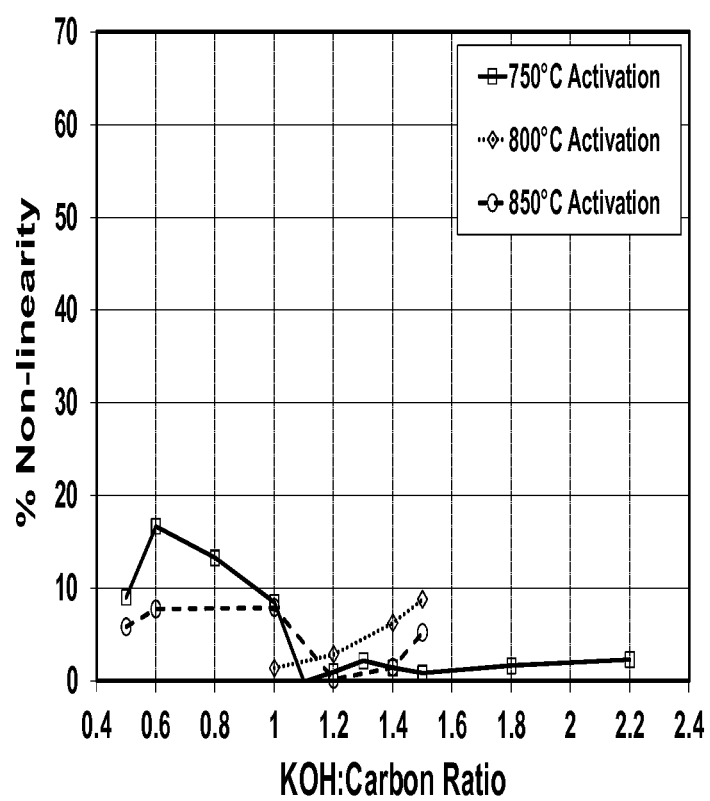
FIG. 6 shows the percentage non-linearity measured in unsymmetrical button cells as a function of KOH to carbon (or char) weight ratio for activated carbon samples prepared at three different activation temperatures.

FIG. 6 shows the non-linearity measured in unsymmetrical button cells as a function of KOH to carbon (or char) weight ratio for the series of three carbon activated samples at 750° C., 800° C., and 850° C., respectively, and then heat treated at 675° C. (see Example 1).

Figure 7:
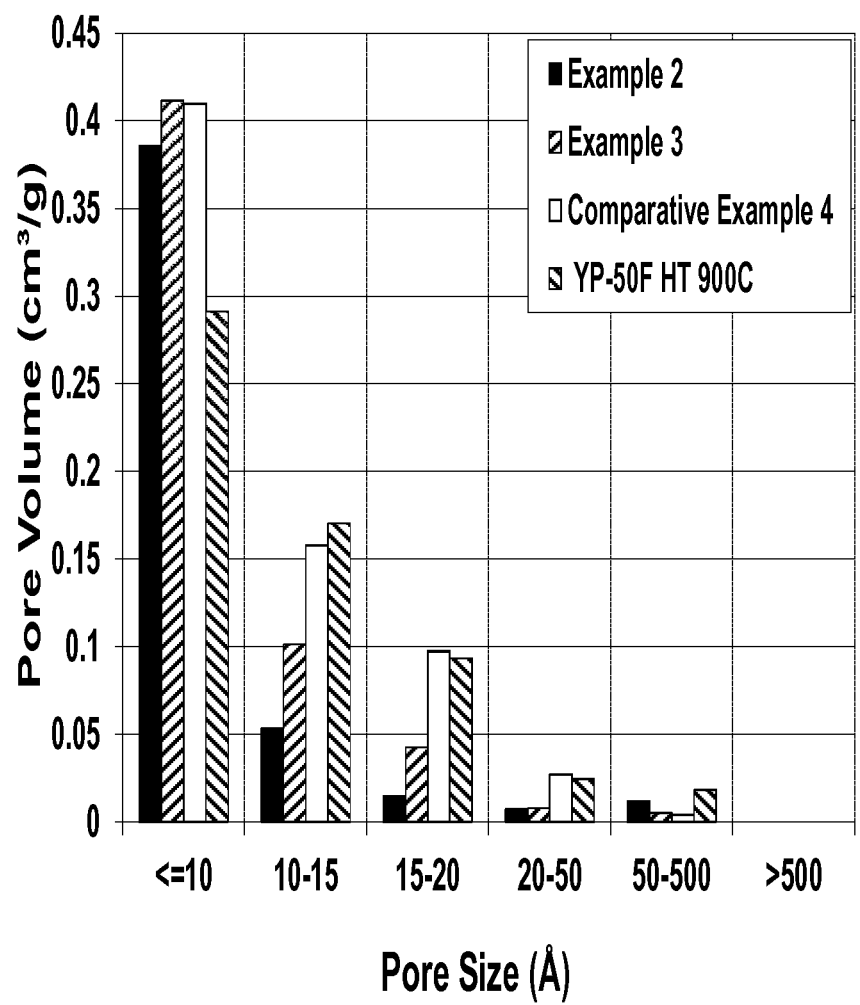
FIG. 7 provides a bar chart showing the pore size distributions of selected activated carbons.

FIG. 7 provides a bar chart showing the pore size distributions of activated carbons in Example 2, Example 3, Comparative Example 4, and YP-50F heat treated at 900° C.

Figure 8:
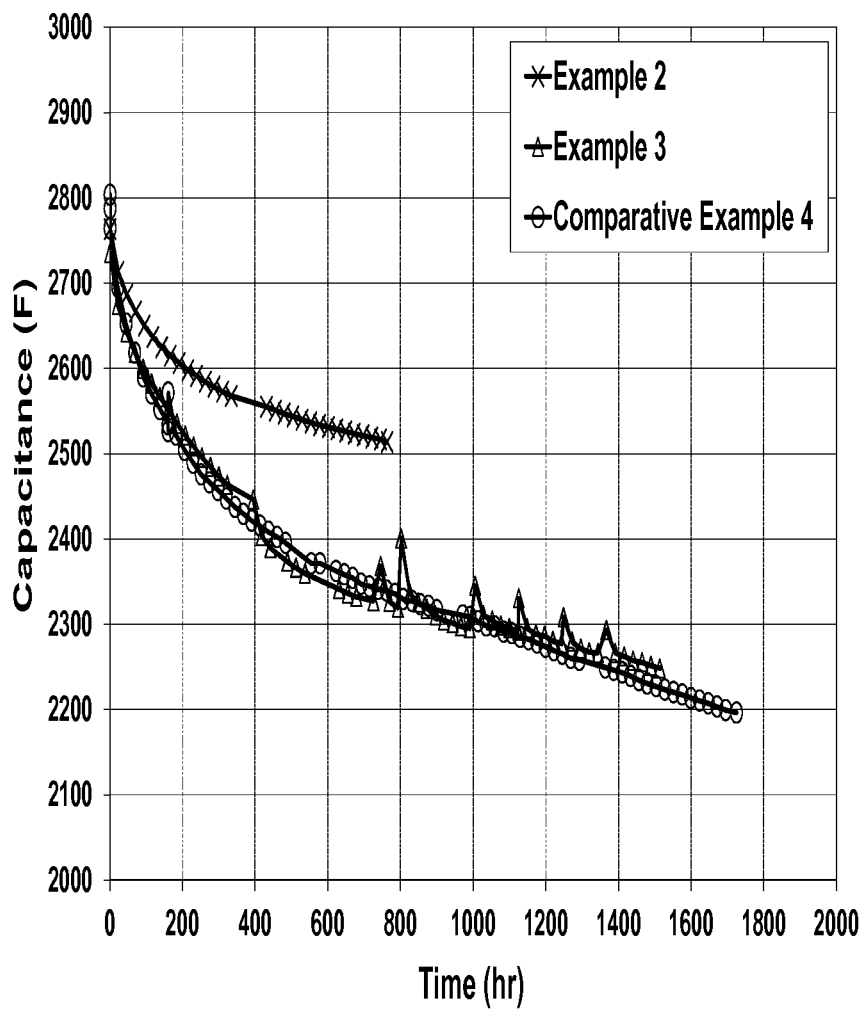
FIG. 8 shows capacitance as a function of time during a constant voltage stress test at 65° C. for unsymmetrical electrochemical double layer capacitor (EDLC) cells comprising selected activated carbons.

FIG. 8 shows capacitance as a function of time during a constant voltage stress test at 65° C. for tuned EDLC cells comprising activated carbons in Example 2, Example 3, and Comparative Example 4. In FIGS. 8 to 11, and in the Examples, Example 2 was tested at 2.7 V. Example 3 and Comparative Example 4 were tested at 3 V.

Figure 9:
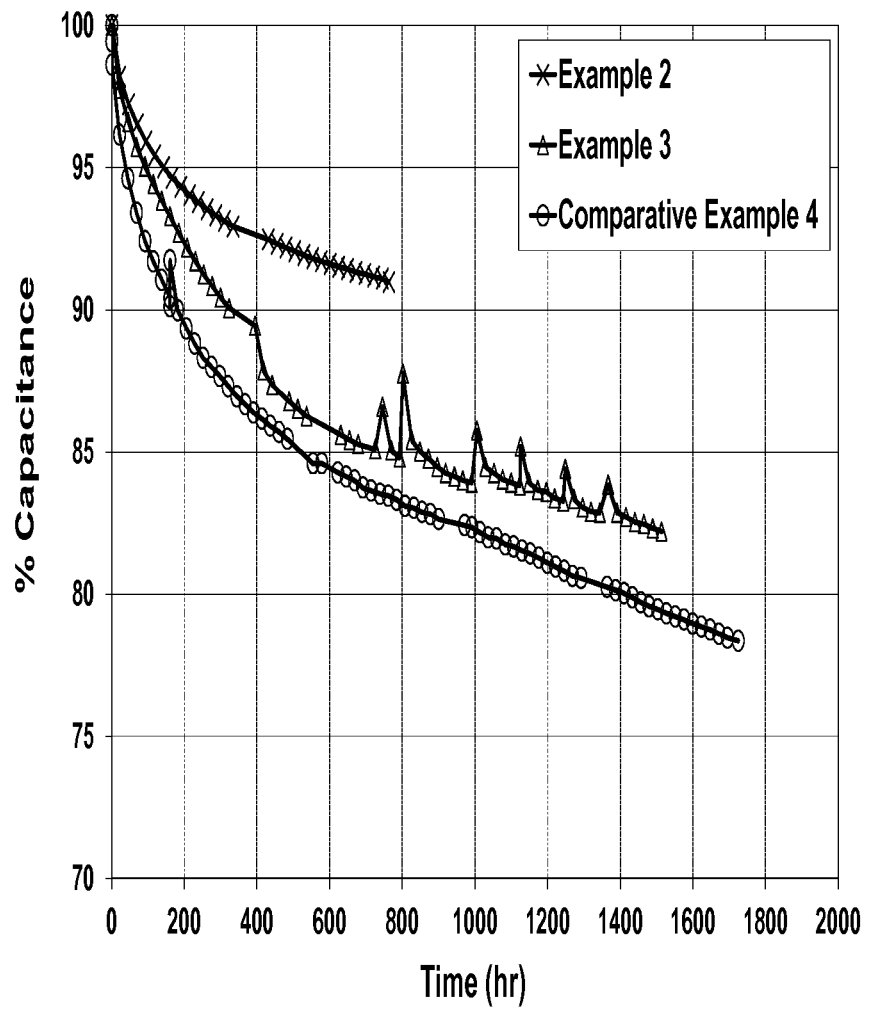
FIG. 9 shows percentage (%) capacitance as a function of time during a constant voltage stress test at 65° C. for unsymmetrical EDLC cells comprising the activated carbons.

FIG. 9 shows percentage (%) capacitance as a function of time during constant voltage stress test at 65° C. for tuned EDLC cells comprising the activated carbons in Example 2, Example 3, and Comparative Example 4.

Figure 10:
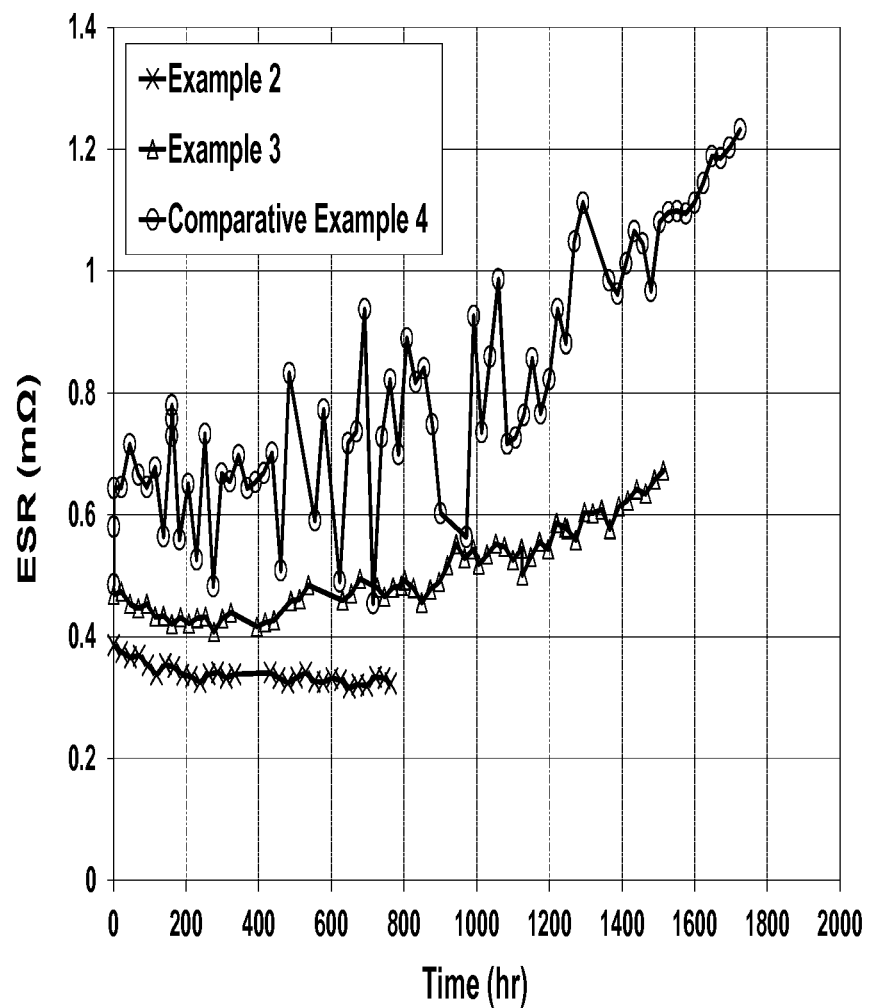
FIG. 10 shows the equivalent series resistance (ESR) as a function of time during a constant voltage stress test at 65° C. for unsymmetrical EDLC cells including selected activated carbons.

FIG. 10 shows the equivalent series resistance (ESR) as a function of time during a constant voltage stress test at 65° C. for unsymmetrical EDLC cells including activated carbons in Example 2, Example 3, and Comparative Example 4.

Figure 11:
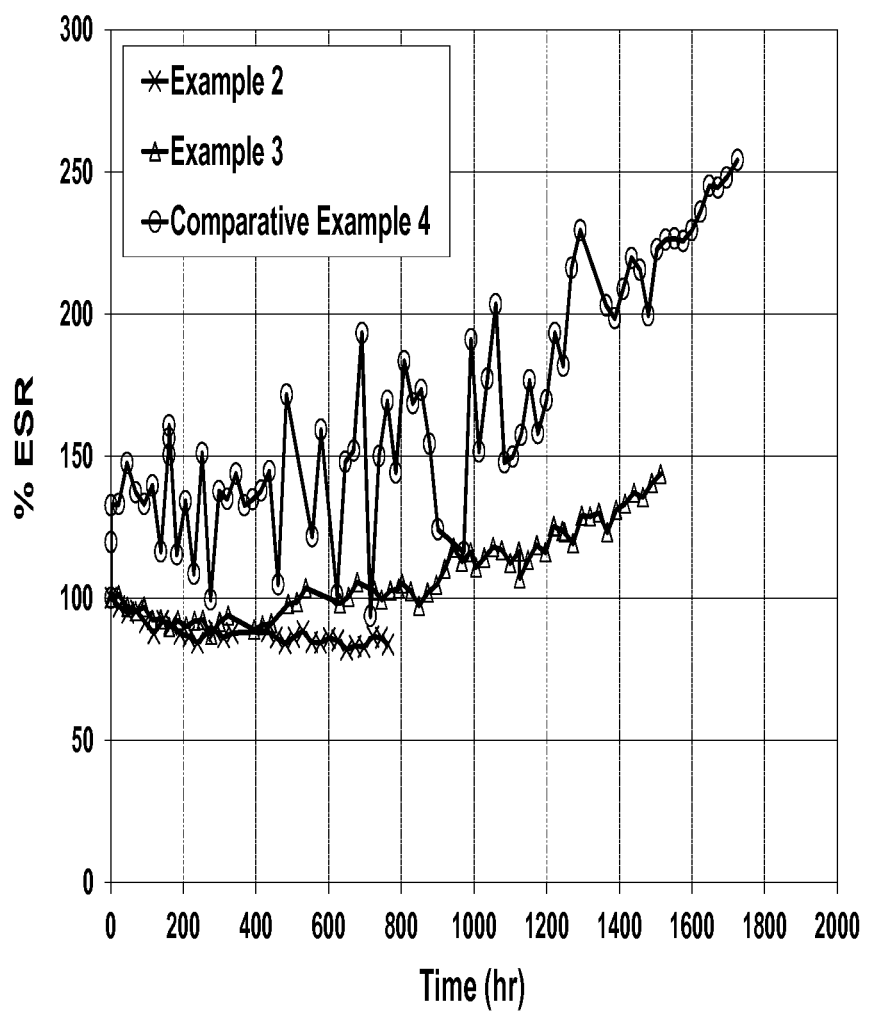
FIG. 11 shows the percentage equivalent series resistance (% ESR) as a function of time during constant voltage stress test at 65° C. for unsymmetrical EDLC cells comprising including selected activated carbons.

FIG. 11 shows the percentage equivalent series resistance (% ESR) as a function of time during constant voltage stress test at 65° C. for tuned EDLC cells comprising including activated carbons in Example 2, Example 3, and Comparative Example 4.

EXAMPLES

The following Examples demonstrate making, use, and analysis of the disclosed activated carbon, electrode, and energy storage device, in accordance with the above general description and procedures.

In embodiments, the disclosure provides a general method of making the disclosed activated carbon. Specific details can be varied, for example, as mentioned in the Examples.

Activated Carbon Preparation

In embodiments, wheat flour was carbonized at 800° C. in a retort furnace purged with $N_2$. The resulting char was milled to a fine powder with $d_{50}$ of about 5 microns. The char powder was mixed with a KOH powder at a desired ratio.

The char-KOH mixture was activated in a retort furnace purged with $N_2$.

A typical furnace cycle consisted of, for example, a ramp-up at a 150° C./hr to a desired activation temperature, soak for 2 hours, and an unassisted cool-down to 120° C.

Next, water vapor was introduced into the furnace by bubbling $N_2$ through hot (about 90° C.) water for 3 hours, and the furnace was allowed to cool unassisted to 70° C. or lower.

The activated material was successively washed and filtered with DI water, with a HCl solution, and with DI water until the pH of the filtrate matched the pH of the DI water. The washed activated carbon was finally heat treated in a retort furnace purged with 1 vol % $H_2/N_2$ mixture. The furnace was ramped at 150° C./hr to a desired heat treatment temperature, soaked for 2 hours, and allowed to cool unassisted to room temperature.

Activated Carbon Sample Characterization

Activated carbon samples were characterized using $N_2$ adsorption on a Micrometrics ASAP 2420. Surface area was characterized by BET theory. Pore volume and pore size distributions were characterized using the Density Functional Theory (DFT), and were calculated from the adsorption isotherms. The pH of the activated carbon samples were measured according to ASTM D3838-05. The oxygen content (wt %) of the activated carbon samples was determined by elemental combustion analysis of vacuum dried samples according to ASTM D5622 and are listed in Table 1.

EDLC Button Cell Preparation and Evaluation

Performance of activated carbon samples in EDLC was first evaluated using button cells, which were prepared and tested using the following procedure.

Electrodes were fabricated by blending the disclosed activated carbon, carbon black (Black Pearl 2000, as conductive additive) and polytetrafluoroethylene (PTFE)(as binder) in the proportion of 85:5:10 by weight, and rolling the mixture into a free-standing film that was cut, for example, into round-shape electrodes.

A button cell was assembled by stacking the following components (all cut to 5/8" in diameter using a punch) in vertical order: current collector #1 (Pt foil)/carbon electrode #1/separator (cellulose paper)/carbon electrode #2/current collector #2 (same as current collector #1).

The carbon electrodes and the separator were pre-soaked in an electrolyte solution, for example, 1.5 M tetraethylammonium tetrafluoroborate (TEA-TBF) in acetonitrile, prior to assembly.

An extra drop of the electrolyte solution was added to the cell after placing carbon electrode #2 and before placing the current collector #2 on the stack.

Finally, the cell was sealed by heating a ring of thermoset sealant around the stack. The button cell was measured using galvanostatic discharge from 2.7 V at a constant discharge current of 20 mA.

From the discharge curve (potential vs. time), the actual energy (in units of watt*second) was calculated by numerically integrating the area under the discharge curve (i.e., the "integrated energy method") using the formula:

$$\text{Energy} = I_{disch} * \int_{V_1}^{V_2} V \, dt$$

where $I_{disch}$ is the discharge current (constant) and $V_1$ and $V_2$ are the initial and end potentials, respectively. The device capacitance ($C_{device}$, in Farad units) was calculated from the energy with the formula:

$$C_{device} = \frac{2 \times I_{disch} * \int_{V_1}^{V_2} V dt}{(V_1^2 - V_2^2)}$$

The specific capacitance was then calculated by dividing the device capacitance by the total volume (volumetric, $C_{sp,v}$, F/cm$^3$) or the total carbon weight (gravimetric, $C_{sp,m}$, F/g) in both electrodes. Alternatively, the device capacitance was also calculated using the slope of the linear portion of the discharge curve (i.e., "slope method").

If the discharge curve is non-linear (typically in the initial phase after the IR drop), the "slope method" would give a higher capacitance value than the "integrated energy method". The percentage difference between the two values is referred to as "non-linearity" or "% non-linearity" and is indicative of restricted ion movement within the pore structure of the activated carbon. Device capacitance calculated using the "slope method" was used only for the calculation of "non-linearity," while specific capacitance values were all calculated using the "integrated energy method".

Four button cells were fabricated and measured for each carbon sample and average values are reported excluding outliers. The specific capacitance was then calculated by dividing the device capacitance by the total volume (volumetric, $C_{sp,v}$, F/cm$^3$) or the total carbon weight (gravimetric, $C_{sp,m}$, F/g) in both electrodes.

In the above button cell construction, electrodes #1 and #2 can be made of the same activated carbon (referred to as "symmetrical cells," i.e., compositionally the same) or different activated carbons (referred to as "tuned cells," "non-symmetrical cells," "unsymmetrical cells," or "asymmetrical cells," i.e., compositionally different). The "unsymmetrical button cells" in the present disclosure were made with a disclosed experimental activated carbon sample and evaluated on a positive electrode, and a Kuraray YP-50F (a commercial activated carbon) sample on the negative electrode. Electrodes in the button cell had dimensions of, for example, five-eighths of an inch diameter and 100 micrometers in thickness.

Example 1

Three series of activated carbons were prepared by thermally activating a char derived from wheat flour at various KOH to char weight ratios (KOH:char), of from 0.5:1 to 2.2:1, and at three different thermal activation temperatures, 750° C., 800° C., and 850° C., respectively. After thermal activation and washing, all the activated carbons samples in the three series were then heat treated at 675° C.

The BET surface area, and DFT pore volume as a function of KOH to char ratio for the 750° C. and 850° C. activation temperature series are shown in FIGS. 1 and 2. Within each temperature series, both the BET surface and DFT pore volume increased as the KOH to char weight ratio was increased. At the same KOH to char weight ratio, both the BET surface and DFT pore volume increased as the activation temperature was increased.

These activated carbons were tested in both symmetrical and unsymmetrical button cells and the results are plotted in FIGS. 3 to 6. The performance in symmetrical button cells is shown in FIGS. 3 and 4. At an activation temperature of 750° C., Csp,v was above 90 F/cc at KOH:char weight ratios of 2.2:1 to 1.5:1, but dropped sharply at ratios lower than 1.5:1, while non-linearity rose sharply. When the activation temperature was increased from 750° C. to 800° C., and then to 850° C., the Csp,v increased with temperature for any given KOH:char weight ratio within the ratio of from 1.5:1 to 1:1, within which the trend at 800° C. was similarly steep to that at 750° C. but the trend was relatively flat at 850° C. (for instance, at 1:1 ratio and 850° C., Csp,v was 87.7 F/cc). Simultaneously, non-linearity showed improvement (i.e., it decreased) with increasing activation temperature. Even though the non-linearity should only be considered a qualitative or semi-quantitative metric, a value of 10% or lower is typically desirable.

Next, the performance of the same three series of carbon samples in tuned (i.e., unsymmetrical) button cells was evaluated and is shown in FIGS. 5 and 6. In the KOH:carbon weight ratio of from 1.5:1 to 1:1, even though the Csp,v (centering around 85 F/cc) was not as high as some of the values in symmetrical button cells, the Csp,v was relatively insensitive to activation temperature and 85 F/cc was still an excellent performance and higher than most commercial carbons. Furthermore, non-linearity stayed below 10% for all carbons in this range. These results demonstrate the potential usefulness of these activated carbons for making practical EDLC devices, which were further validated in Examples 2 and 3.

Example 2

An activated carbon was prepared by activating a char made from wheat flour at a KOH to char ratio of 1:1 at 850° C., followed by heat treatment at 900° C. Properties of the activated carbon are shown in Table 1, and the DFT pore size distribution is shown in FIG. 7. An unsymmetrical EDLC cell was fabricated using this activated carbon on the positive electrode and YP-50F heat treated at 900° C. on the negative electrode, and 1.2 M triethylmethylammonium tetrafluoroborate (TEMA-TFB) in acetonitrile as the electrolyte. The cell had dimensions similar to those of a 12 oz. soda can. Beginning of life (BOL) performance is shown in Table 2.

TABLE 1

Properties of activated carbons in the Examples.

|  | BET Surface Area (m²/g) | DFT Total Pore Volume (cc/g) | pH | Sub-nm Pore Volume (cc/g) | Micropore Volume (cc/g) | % Sub-nm Pore Volume | % Micropore Volume | Oxygen Content (wt %) |
|---|---|---|---|---|---|---|---|---|
| Example 2 | 1362 | 0.47 | 9.1 | 0.39 | 0.45 | 81.6 | 96.0 | 0.95 |
| Example 3 | 1683 | 0.57 | 8.6 | 0.41 | 0.56 | 72.4 | 97.7 | 0.78 |

TABLE 1-continued

Properties of activated carbons in the Examples.

| | BET Surface Area (m²/g) | DFT Total Pore Volume (cc/g) | pH | Sub-nm Pore Volume (cc/g) | Micropore Volume (cc/g) | % Sub-nm Pore Volume | % Micropore Volume | Oxygen Content (wt %) |
|---|---|---|---|---|---|---|---|---|
| Comparative Example 4 | 1989 | 0.70 | ca. 6.5 | 0.41 | 0.66 | 58.9 | 95.6 | 0.64 |
| YP-50F heat treated at 900° C. | 1693 | 0.60 | ca. 7.0 | 0.29 | 0.56 | 48.7 | 92.8 | 0.58 |

TABLE 2

Beginning of life (BOL) performance of unsymmetrical EDLC cells.

| | Capacitance (F) | ESR (mΩ) | Test Voltage (V) |
|---|---|---|---|
| Example 2 | 2783 | 0.33 | 2.7 |
| Example 3 | 2766 | 0.38 | 3 |
| Comparative Example 4 | 2803 | 0.48 | 3 |

Example 3

An activated carbon was prepared by activating a char made from wheat flour at a KOH to char ratio of 1.5:1 and 850° C., followed by heat treatment at 900° C. Properties of the resulting activated carbon are shown in Table 1 and the DFT pore size distribution is shown in FIG. 7.

A unsymmetrical EDLC cell was fabricated using this activated carbon on the positive electrode and YP-50F heat treated at 900° C. on the negative electrode and 1.2 M TEMA-TFB in acetonitrile as electrolyte. Beginning of life (BOL) performance for this capacitor is shown in Table 2.

Comparative Example 4

An activated carbon was obtained by activating a char derived from wheat flour at KOH to char ratio of 2.2:1 and 750° C., followed by heat treatment at 900° C. Properties of the activated carbon are shown in Table 1 and the DFT pore size distribution is shown in FIG. 7.

Specifically, FIG. 7 is a bar chart showing the pore size distributions of activated carbons in Example 2, Example 3, Comparative Example 4, and YP-50F heat treated at 900° C.

A unsymmetrical EDLC cell was fabricated using this activated carbon on the positive electrode and YP-50F heat treated at 900° C. on the negative electrode, and 1.2 M TEMA-TFB in acetonitrile as electrolyte.

Beginning of life (BOL) performance is shown in Table 2. Table 1 demonstrates that the activated carbons in Examples 2 and 3 had significantly lower surface areas and pore volumes but had significantly higher pH values than the activated carbon in Comparative Example 4.

Table 2 shows that EDLC cells made with the activated carbons in Examples 2 and 3 had similar initial capacitances and lower ESRs than a cell made with the activated carbon in Comparative Example 4.

These cells were also put under the constant voltage stress test at 65° C. and the results are shown in FIGS. 8 to 11. Example 2 was tested at 2.7 V.

Example 3 and Comparative Example 4 were tested at 3 V. Even though Example 2 could not be compared directly with Comparative Example 4 due to differences in test voltage, the capacitance decay both in an absolute and a normalized sense was satisfactory under 2.7 V.

For reference, an industrial specification is for normalized capacitance to remain at 80% or higher at 1500 hours under constant voltage (2.7 V or 3 V, depending on cell's voltage rating) stress at 65° C. ESR for Example 2 also held steady.

For Example 3, the absolute capacitance decay closely tracked that of Comparative Example 4, while the normalized capacitance decay was better than that of Comparative Example 4 up to about 1500 hours. The ESR also held steady.

Examples 2 and 3 show that the activated carbons of the disclosure can be used to make EDLC devices having satisfactory performance (both initial and long term) while the amount of KOH used for activation can be reduced by, for example, 55 wt % and 32 wt %, respectively, and the aforementioned several significant advantages can be realized from the disclosed process.

The disclosure has been described with reference to various specific embodiments and techniques. However, it should be understood that many variations and modifications are possible while remaining within the scope of the disclosure.

What is claimed is:

1. An electrode in an energy storage device, comprising:
   at least one activated carbon, comprising:
      a surface area of from 1000 to 1700 m²/g;
      a pore volume from 0.3 to 0.6 cc/g;
      a chemically bonded oxygen content of 0.01 to 1.5 wt %; and
      a pH of from 7.5 to 10.

2. The electrode of claim 1, wherein the at least one activated carbon has at least one of: a surface area from 1300 to 1700 m²/g; a pore volume from 0.4 to 0.6 cc/g; a pH from 8 to 10; a chemically bonded oxygen content of 0.01 to 1 wt %; an initial specific capacitance of 80 F/cc to 120 F/cc, as measured in a symmetrical electrochemical double layer capacitor cell having an organic electrolyte; or a combination thereof.

3. The electrode of claim 1, wherein the energy storage device is an electrochemical double layer capacitor and has a durability characterized by maintaining at least 80% of initial capacitance and a maximum 200% of initial equivalent series resistance when held at 3V and 65° C. for 1500 hours.

4. An energy storage device, comprising:
   at least one electrode, comprising:
      at least one first activated carbon, comprising:
         a surface area of from 1000 to 1700 m²/g;
         a pore volume from 0.3 to 0.6 cc/g;
         an chemically bonded oxygen content of 0.01 to 1.5 wt %; and
         a pH of from 7.5 to 10.

5. The energy storage device of claim 4, wherein the at least one first activated carbon has at least one of: a surface area from 1300 to 1700 m$^2$/g; a pore volume from 0.4 to 0.6 cc/g; a pH from 8 to 10; an oxygen content of 0.01 to 1 wt %; an initial specific capacitance of 80 F/cc to 120 F/cc, as measured in a symmetrical electrochemical double layer capacitor cell having an organic electrolyte; or a combination thereof.

6. The energy storage device of claim 4 wherein the device is an electrochemical double layer capacitor having a durability characterized by maintaining at least 80% of initial capacitance and at most 200% of the initial equivalent series resistance when held at 3V and 65° C. for 1500 hours.

7. The energy storage device of claim 4 further comprising:
 a housing, and within or integral with the housing:
  a positive and a negative electrode;
  a separator situated between the electrodes;
  an electrolyte in contact with the electrodes; and
  two current collectors.

8. The energy storage device of claim 7 wherein the positive and the negative electrode are the same or different.

9. The energy storage device of claim 8 wherein the positive electrode and the negative electrode comprise the at least one first activated carbon.

10. The energy storage device of claim 8 wherein the positive electrode comprises the at least one first activated carbon and the negative electrode comprises a second activated carbon that is different from the first activated carbon.

* * * * *